Dec. 6, 1938.  N. L. KEARNEY  2,139,367
RADIATOR CORE CONSTRUCTION
Filed Nov. 20, 1935
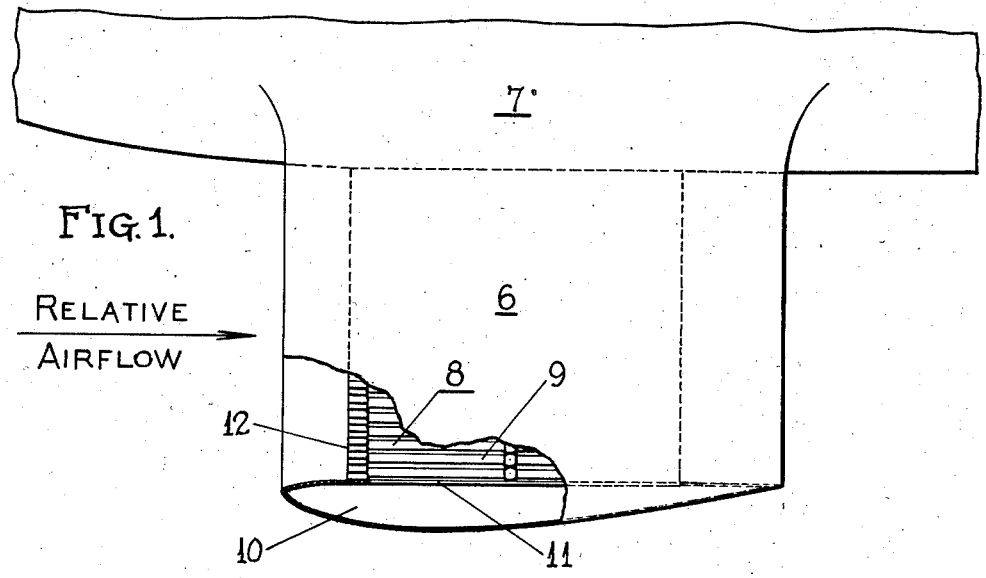
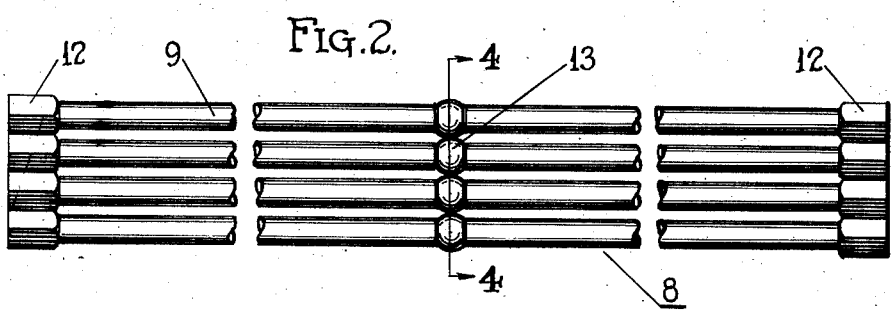
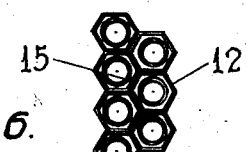
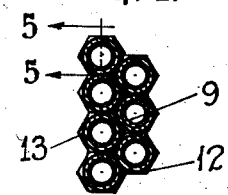
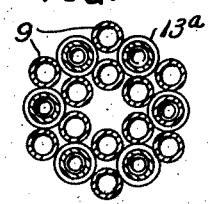
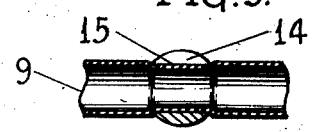
INVENTOR.
NORMAN L. KEARNEY.
BY
ATTORNEYS.

Patented Dec. 6, 1938

2,139,367

UNITED STATES PATENT OFFICE 2,139,367

RADIATOR CORE CONSTRUCTION

Norman L. Kearney, Buffalo, N. Y., assignor, by mesne assignments, to Curtiss-Wright Corporation, a corporation of New York Application November 20, 1935, Serial No. 50,647

2 Claims. (Cl. 257—128)

This invention relates to heat exchange devices and more particularly to the support of tubular elements used therein. It is especially adapted to the intermediate support of relatively thin-walled tubes used in long core radiator construction as utilized in aircraft.

It has frequently been found advantageous in the design of radiators, oil coolers or other heat exchange devices in aircraft, to provide cores formed of relatively long tubes horizontally alined with the airstream, but the methods heretofore used in such constructions to prevent contact due to sagging of the thin-walled tubes have not proven satisfactory. These prior methods invariably resulted either in a spliced joint of appreciable weight due to telescoping of the tube walls and the addition of solder material, or in the decrease in efficiency due to the disturbance to both fluid and heat flow caused by the relatively large metallic contact area between the tubes. This also had the undesired effect of forming a baffle or separator and thereby creating the equivalent of a two-pass radiator core. Other prior methods have invariably proven to be inherently weak from a structural point of view, costly, and relatively difficult to assemble.

The present invention covers briefly the provision of a spacer or separator, having a spherical form, pressed or formed on the tube wall such that it spaces and supports the same equidistantly from the adjacent tubes by tangential contact with these tubes or the spacers with which these tubes are similarly provided.

It is, accordingly, an object of this invention to provide a simple and inexpensive means whereby relatively long thin tubes may be maintained at a predetermined spacing from each other intermediate their ends and by which the tubes tend to support each other and eliminate or minimize sagging. It is also an object to provide such a spacing device which is light in weight and simple and quickly applied and assembled.

It is a further object to provide a tube spacer which contacts the adjacent tubes or spacers over a minimum area and which further maintains an adequate space about the tubes and spacers in the plane of their points of contact, to facilitate the flow of the liquid therethrough. It is also an object of this invention to provide such a spacer which will not become displaced by ordinary usage and which does not require soldering or other attachment to the adjacent tubes or spacers.

It is a further object to provide a tube with a spacer which is readily positioned for assembly regardless of any axial rotation necessary to properly position the ends of the tubes for their assembly.

These and other desirable objects and advantages of the present invention will be illustrated in the accompanying drawing and described in the specification, a preferred embodiment being disclosed by way of illustration only, for, since the underlying principles may be incorporated in other specific devices, it is not intended to be limited to the one here shown except as such limitations are clearly imposed by the appended claims.

In the accompanying drawing in which like characters of reference indicate corresponding parts in all the views:

Fig. 1 is a broken view of a radiator to which my invention is shown to be adapted;

Fig. 2 is an enlarged elevation of a portion of the core of the radiator;

Fig. 3 is an end elevation of the core portion shown in Fig. 2;

Fig. 4 is a cross-sectional view as seen along the lines 4—4 of Fig. 2;

Fig. 5 is a cross-sectional view of a tube spacer as viewed along the lines 5—5 of Fig. 4; and Fig. 6 is a cross-sectional view of a modification in which slightly larger spacers are provided on alternate series of tubes.

With particular reference to Fig. 1, the radiator 6 is shown attached to an aircraft body 7 which obviously may be either a portion of the fuselage, wing or engine nacelle from which the radiator may either be suspended or extended laterally. The radiator 6 comprises essentially a core portion 8 consisting of a plurality of parallel spaced tubes 9 alined with the relative airflow for the passage of cooling air therethrough. The core 8 is enclosed by the header 10, preferably of airfoil shape in cross-section, and which may be of either circular or semi-circular outline as viewed in the direction of the relative airflow indicated by the arrow in Fig. 1.

A portion of the inner wall of the header 10 positioned against the core 8 of nested tubes 9 is removed to provide an opening 11 through which the liquid to be cooled in the radiator may pass either to or from the core section 8 to the header 10. It will be readily understood that the necessary piping and connections from the radiator core 8 and the header 10, while not shown in the drawing, will be provided in a manner well known to those acquainted with the art, in order to complete the cooling or other system of which the radiator 6 forms a part and to which this invention is particularly adapted.

As shown in Fig. 2, the core 8 of the radiator 6 comprises relatively long tubes 9, preferably of seamless copper or similar heat transmitting material, and of comparatively light gauge to conserve weight. Each tube 9 has formed at its ends hexagonal portions 12 which serve to properly space the tubes from each other, and on the outer surfaces of which, they are soldered together to form a relatively rigid end section adapted to establish the arrangement and spacing of the tubes, and to present a large frontal area for the inflow of cooling air. It will be readily understood that the air in flowing thru the interior of the tubes 9 absorbs heat from the relatively warmer water, or other liquid, in contact with the exterior of the tubes, thereby effecting the desired cooling of the liquid.

Due to the length of the tubes 9, and notwithstanding the fact that they are made as thin and light as practicable, the weight of each tube causes an appreciable deflection or sagging which is aggravated by the excessive vibration often found in aircraft structures, and unless spaced or supported intermediate their ends, this deflection results in impaired radiator efficiency and shorter service life of the tubes. These and other objections are overcome in a simple manner, and at low cost, by the use of spacers 13, which are pieces of copper or other ductile material which may be provided in strips having a segmental cross-section, one of its faces being flat and its opposite face being arcuate in outline, as may be clearly seen in the cross-section in Fig. 5. These strips are cut to the required length or approximately the circumference of a circle whose diameter is slightly less than the outside diameter of the tubes 9.

The strip is then pressed about the tube 9 at some predetermined point intermediate the tube ends where it is desired that it be supported, preferably at its mid-point in the case of a single supported tube core as shown as the drawing, or approximately at the one-third points in the case of a doubly supported radiator core. Either before or during the pressing operation, the tube 9 has its wall reduced in diameter for a distance substantially equal to the strip width as indicated at 15 in Fig. 5, about which reduced portion the spacer 13 fits tightly with its ends 14 in closely abutting relationship. The shoulders in the tube wall formed at the ends of the reduced portion 15 serve to prevent axial displacement of the spacer. It will also be obvious that the spacer 13 may be formed on the reduced tube portion in a manner which would permit of its rotation thereabout and which would thereby also serve the purposes of this invention.

After being formed on the tubes 9, the spacers 13 resemble balls or beads having large openings pierced or occupied by the reduced portions of the tubes 9. The only portions projecting beyond the original outer cylindrical surface of the tube is the spherical outer portion of the spacer, which was formerly the arcuate face of the strip, the diameter of this spherical surface being substantially equal to the distance between the axes of adjoining tubes as measured laterally or equivalent to the distance across the flats of the hexagonal end portions 12 of the tubes. Therefore, when the spacers are pressed onto each tube at the same point thereon with respect to the tube ends, the tubes when brought into their nested or assembled relationship will have the flat surfaces of their hexagonal ends coinciding, and the centers and tangent, or touching points, of all the spacers lying in the same plane normal to the tube axes, which latter are then parallel to, and equidistant from each other.

This assembled relationship is readily accomplished as each spacer adopts a touching or tangential relationship with the adjacent spacer regardless of any axial rotation of the tube which may be required in order to properly position the hexagonal ends 12 for soldering or other attachment. Due to the fact that in the case of hexagonal ended tubes there will be six adjacent spacers touching any given spacer in the center of a group of six, and since these six touch at tangent points only, there will be six equal clearance spaces around the surface of each spacer between the tangent points mentioned. This insures minimum restriction of liquid flow in the direction of the tube axes and from one side of a spacer to the other. It also provides minimum contact areas between adjoining tubes, thereby preventing absorption or loss of heat from one tube to another with its resultant effect upon the efficiency of the heat exchange device.

Radiator cores which are provided with spacers as outlined in this invention are not so likely to sag or deflect under their own weight since the entire core has been found to be reinforced by the presence of the spacers notwithstanding that they are not attached but merely touch each other. It has also been found that the slight additional weight due to the spacers has no appreciable effect upon this deflection or sagging. In cases where the tubes are extremely long, such spacers have been found to minimize the extent of the sagging and to maintain the proper parallel relationship of the tubes thereby preventing chafing or rupture of the tubes which has frequently occurred in long core radiators constructed prior to this invention, due to vibration and to the inherent quality of some tubes sagging to a greater extent than others.

This invention is not limited to air-cooled radiators but is equally well adapted to use in oil coolers, condensers, water recovery apparatus for aircraft, and in fact in any tubular heat exchange device where the length of the tubes or other conditions are such that the tubes are required to be supported between their ends. The spacers obviously may be of aluminum or other suitable material, can be welded or brazed to the tube wall where it is desired not to deform the latter, and its cross section in the plane of the tube axis can be elliptical or other suitable shape so long as its cross section in the plane of its contact points remains circular and concentric with the tube axis.

In a modification of this invention as shown in Fig. 6, further savings in cost can be accomplished by providing slightly larger spacers 13a on alternate tubes 9, in which case the spacer rests against the exterior surfaces of the adjoining tubes.

It is to be understood that the drawing and the above description are for purposes of illustration only and various changes and modifications which may occur to one skilled in the art are to be considered within the scope and spirit of this invention.

I claim as my invention:

1. In radiator construction, a plurality of parallel fluid conveying tubes having their ends attached such that a predetermined arrangement and spacing of the said tubes is obtained as considered from within the plane normal to the axes of the said tubes, the said tubes having depressed portions intermediate their ends, spacers engaging the said depressed portions, each of the said spacers being bent and pressed from a strip of material of segmental cross section about the said depressed portion of each tube such that axial movement thereon is prevented, the said spacers after bending and pressing adopting a form having round outer surfaces, such that the said arrangement and spacing of the tubes are maintained by tangential contact of the outer surfaces of the said spacers.

2. In a heat exchange device, a plurality of parallel tubes having depressed portions intermediate their ends, and spacing means externally engaging the said depressed tube portions, the said spacing means comprising a concentrically disposed ring adapted to tangentially contact like means on adjacent equidistantly spaced tubes in the transverse plane of its greatest diameter, the said means reducing gradually in diameter as measured outwardly from the said transverse plane of contact and greatest diameter.

NORMAN L. KEARNEY.